July 31, 1945.  N. B. STRACHOVSKY  2,380,899
MOUNTING
Filed Jan. 21, 1944
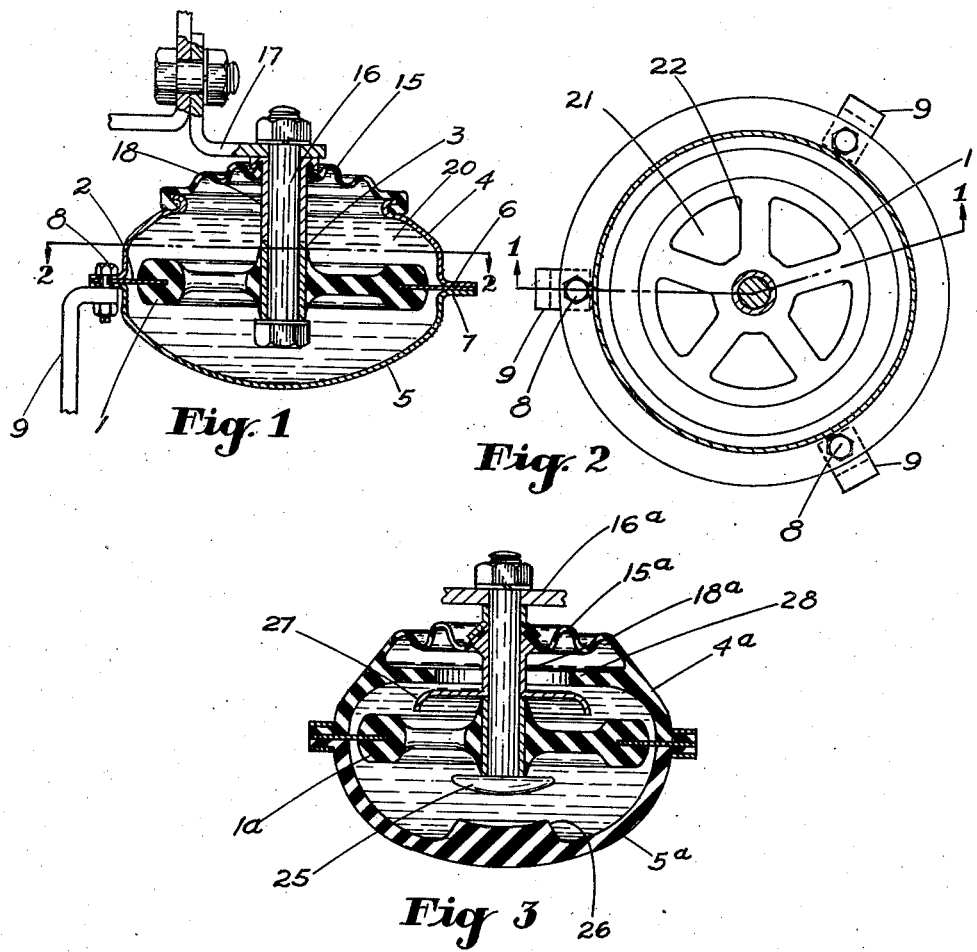
Nikita B. Strachovsky
Inventor Patented July 31, 1945

2,380,899

UNITED STATES PATENT OFFICE 2,380,899

MOUNTING

Nikita B. Strachovsky, Erie, Pa., assignor to Lord Manufacturing Company, Erie, Pa., a corporation of Pennsylvania Application January 21, 1944, Serial No. 519,091

10 Claims. (Cl. 248—358)

This invention relates to mountings which include resilient bodies, usually made of rubber, for insulating vibrations. Such mountings are sometimes used in atmospheres which contain constituents that so attack or affect the rubber, either chemically or physically, that its effectiveness for its intended purpose becomes destroyed or impaired. For example, it has been found that when airplanes fly in the stratosphere the rubber of mountings used on them is quickly attacked and rendered substantially useless by the ozone in the atmosphere. A concentration of a few hundredths of one per cent of ozone, such as exists in stratospheric atmosphere, will oxidize rubber in a few minutes.

The object is to provide a mounting of the character explained having a resilient body for insulating vibrations which is effectively protected against impairment, either chemically or physically, by constituents of the atmospheres in which the mountings are used.

The invention is illustrated in the accompanying drawings, in which Fig. 1 is a vertical central sectional view of one form of mounting embodying the invention; Fig. 2 a horizontal sectional view taken on the line II—II of Fig. 1; and Fig. 3 a view similar to Fig. 1 showing a modification of construction.

The mounting provided according to this invention has a resilient body formed of rubber, which may be either natural rubber or any of the various synthetic compositions having the general characteristics of natural rubber, and which is of the form desired for its intended use. Surrounding and enclosing the rubber there is a liquid-containing casing which is preferably hermetically sealed, and extending through the wall of the casing there are connectors which are suitably attached within the casing to the body of rubber and are formed exteriorly of the casing for attachment to relatively movable parts. To protect the rubber thus enclosed, the casing is provided with a body of liquid which immerses the rubber and is chemically and physically inert to it and to rubber-attacking constituents of the atmosphere in which the mounting is used. While various liquids may be used, it is preferred to use glycerin which has the characteristics just stated. Other suitable liquids are those alcohols which are known to have the stated characteristics, and also certain well known liquids that are used to actuate hydraulic brakes. The portion of the mounting within the casing is so formed that liquid may flow in such a manner that it does not materially impair the insulating action of the rubber when the mounting is subjected to vibrations in use.

In the illustrative embodiment of the invention, having reference first to that shown in Figs. 1 and 2, the rubber element of the mounting is of plate form having a generally disc-shaped body 1 whose peripheral portion is bonded to a plate-like connecting ring 2 and whose central portion or hub is bonded to an axially disposed metal tube 3. Surrounding and enclosing the body of rubber there is a metal casing having an upper portion 4 and a lower portion 5, whose peripheries are provided with outwardly extending flanges 6 and 7 which are attached to the outer portions of ring 2 to form a sealed joint. Flanges 6 and 7, as well as the outer portion of ring 2, are provided with a suitable number of holes to receive bolts 8 for attaching the mounting to supports 9.

The top of upper portion 4 of the casing is provided centrally with an opening which is closed by a readily flexible bellows 15 that may be formed of thin plastic material, such as that well known to the trade as "Thiokol." Extending through tube 3 there is a connecting pin 16 in the form of a bolt which also extends through an opening in the central portion of bellows 15, and exteriorly of the casing is adapted to be attached to a support 17, between which and supports 9 vibrations occur. Surrounding and fitting tightly upon the upper portion of bolt 16 there is a sleeve 18 whose lower end abuts against tube 3 and whose upper end is flanged outwardly and downwardly to form a sealed connection with the edge of the central opening of bellows 15. Similarly, the edge of casing portion 4 is turned outwardly to form a sealed connection with the periphery of the bellows as shown.

The casing contains a body of liquid 20 of the character explained above which immerses the rubber body 1 but preferably does not entirely fill the casing. So that movements of the rubber body will not be materially restrained when there are relative movements between the connectors 2 and 16, provision is made for free flow of the liquid from one to the other side of body 1. This is preferably done by providing body 1 with a plurality of openings 21, the effect of which is to form spokes 22 between the peripheral and the hub portions of the body.

In the embodiment of the invention illustrated in Fig. 3 the upper and lower portions 4a and 5a of the casing are formed of a suitable plastic, such as "Thiokol," instead of metal. Bellows 15a, being made of the same material, is formed integrally with casing portion 4a, but to give it requisite flexibility it is materially thinner than the walls of the casing section. Also, in the form shown in Fig. 3 provision in the form of detents adapted to engage each other is made for snubbing excessive oscillation of the mounting in both directions. For this purpose the bottom of bolt 16a is provided with an enlarged curved head 25 adapted to engage the top of a correspondingly shaped projection 26 formed on casing section 5a. Above body 1a, the lower end of sleeve 18a is provided with a radially-extending peripherally-flanged plate 27 whose upper face is adapted to engage a ring 28 which extends inwardly from and is formed integrally with casing portion 4a. These upper and lower snubbers are so formed that the snubbing of excessive oscillation is effected mainly through deformation of the parts of the casing without extending them or materially flexing their walls inwardly, downward movement of bolt 16a being snubbed by its head 25 striking the top of projection 26, and upward movement of the bolt being snubbed by the engagement of plate 27 with ring 28. Otherwise the mounting shown in Fig. 3 is similar to that shown in Figs. 1 and 2.

What I claim as my invention is:

1. A resilient mounting comprising a body of rubber, a casing having a wall that encloses the rubber, and connectors attached to said body having portions extending through the casing wall for attachment to relatively movable parts, the casing having yieldable connections with the connectors to permit relative movements of said connectors and containing a body of liquid which immerses said rubber and is chemically and physically inert thereto and to rubber-attacking constituents of atmosphere in which the mounting is used.

2. A resilient mounting comprising a disc-shaped body of rubber, a casing having a wall that encloses the rubber, a plate-like connecting ring bonded with the peripheral portion of the rubber and extending through the casing wall, a connector pin attached axially to the central portion of the rubber and extending through the casing wall, the casing having yieldable connections with the connectors to permit relative movements of said connectors and containing a body of liquid which immerses said rubber and is chemically and physically inert thereto and to rubber-attacking constituents of atmosphere in which the mounting is used.

3. A resilient mounting comprising a body of rubber, a casing having a wall that encloses the rubber, and connectors attached to said body having portions extending through the casing wall for attachment to relatively movable parts, the casing having yieldable connections with the connectors to permit relative movements of said connectors and containing a liquid body of glycerin which immerses said rubber.

4. A resilient mounting comprising a body of rubber, a casing having a wall that encloses the rubber, and connectors attached to said body having portions extending through the casing wall for attachment to relatively movable parts, the casing having yieldable connections with the connectors to permit relative movement of said connectors and containing a liquid body of alcohol which immerses said rubber and is chemically and physically inert thereto and to rubber-attacking constituents of atmosphere in which the mounting is used.

5. A resilient mounting comprising a body of rubber, a casing having a wall that encloses the rubber, and connectors attached to said body having portions extending through the casing wall for attachment to relatively movable parts, the portion of the casing wall that surrounds one of the connectors being readily flexible to permit relative movements of the connectors, the casing containing a body of liquid which immerses said rubber and is chemically and physically inert thereto and to rubber-attacking constituents of atmosphere in which the mounting is used.

6. A resilient mounting comprising a disc-shaped body of rubber having openings extending through it for the flow of liquid from one to the other side thereof, a casing having a wall that encloses the rubber, a plate-like connecting ring bonded with the peripheral portion of the rubber and extending through the casing wall for attachment to one of two relatively movable parts, and a connector pin attached axially to the central portion of the disc and extending through the casing wall for attachment to the other of said parts, the casing having yieldable connections with the connectors to permit relative movements of said connectors and containing a body of liquid which immerses said rubber and is chemically and physically inert thereto and to rubber-attacking constituents of atmosphere in which the mounting is used.

7. A resilient mounting comprising a disc-shaped body of rubber, a casing having a wall that encloses the rubber, a plate-like connecting ring bonded to the peripheral portion of the rubber and extending through the casing wall for attachment to one of two relatively movable parts, a connector pin attached axially to the central portion of the disc and extending through the casing wall for attachment to the other of said parts, the interior of the casing and said pin being provided with detents adapted to engage each other to snub excessive vibrations, and the casing containing a body of liquid which immerses such rubber and is chemically and physically inert thereto and to rubber-attacking constituents of atmosphere in which the rubber is used.

8. A resilient mounting comprising a body of rubber, a casing having a wall enclosing the rubber, and connectors attached to said body for attachment to relatively movable parts, the casing containing a body of liquid which immerses said rubber, and the body being provided with vertically-disposed openings for the free flow of said liquid from one to the other side thereof.

9. A resilient mounting comprising a body of rubber, a casing having a wall enclosing the rubber, and connectors attached to said body and extending through the casing wall for attachment to relatively movable parts, the casing containing the body of liquid which immerses said rubber and is chemically and physically inert thereto and to rubber-attacking constituents of atmosphere in which the body is used, and the mounting being provided with vertically-disposed openings for the free flow of such liquid from one to the other side thereof.

10. A resilient mounting comprising a disk-shaped body of rubber, a casing having a wall that encloses the rubber, a plate-like connecting ring bonded to the peripheral portion of the rubber and extending through the casing wall, and a vertically disposed connector pin attached axially to the central portion of the rubber, the casing containing a body of liquid which immerses said rubber and is chemically and physically inert thereto and to rubber-attacking constituents of atmosphere in which the mounting is used, and the body being provided with vertically-disposed openings for the free flow of liquid from one to the other side thereof.

NIKITA B. STRACHOVSKY.